(12) United States Patent
Konstant (10) Patent No.: US 7,780,019 B2
(45) Date of Patent: Aug. 24, 2010

(54) CANTILEVER PALLET CART

(75) Inventor: Anthony N. Konstant, Winnetka, IL (US)

(73) Assignee: Konstant Products, Inc., Skokie, IL (US)

( * ) Notice: Subject to any disclaimer, the term of this patent is extended or adjusted under 35 U.S.C. 154(b) by 148 days.

(21) Appl. No.: 11/476,183

(22) Filed: Jun. 27, 2006

(65) Prior Publication Data

US 2007/0295682 A1 Dec. 27, 2007

(51) Int. Cl.
A47F 5/08 (2006.01)

(52) U.S. Cl. ...................................... 211/151

(58) Field of Classification Search ................. 211/151, 211/59.2, 126.15, 162; 193/35 R; 414/276, 414/286, 266; 312/334.7, 334.8, 334.12, 312/334.13, 334.39, 334.41, 334.42
See application file for complete search history.

(56) References Cited

U.S. PATENT DOCUMENTS

| | | | | |
|---|---|---|---|---|
| 2,644,588 | A * | 7/1953 | Brown | 108/102 |
| 2,889,907 | A * | 6/1959 | Sullivan | 193/35 R |
| 4,227,466 | A * | 10/1980 | Rooklyn | 108/93 |
| 4,462,500 | A | 7/1984 | Konstant | |
| 4,482,066 | A * | 11/1984 | Dykstra | 211/151 |
| 4,582,188 | A * | 4/1986 | Seiz et al. | 193/40 |
| 4,613,270 | A | 9/1986 | Konstant | |
| 4,687,404 | A * | 8/1987 | Seiz et al. | 414/276 |
| 4,773,546 | A * | 9/1988 | Konstant | 211/151 |
| 4,915,240 | A | 4/1990 | Konstant | |
| 4,988,251 | A * | 1/1991 | Kinney | 414/276 |
| 5,170,896 | A | 12/1992 | Konstant | |
| 5,180,069 | A * | 1/1993 | Krummell et al. | 211/151 |
| 5,310,066 | A | 5/1994 | Konstant | |
| 5,312,004 | A * | 5/1994 | Krummell et al. | 211/151 |
| 5,476,180 | A | 12/1995 | Konstant | |
| 5,848,713 | A * | 12/1998 | Allen | 211/151 |
| 6,474,484 | B1 * | 11/2002 | Miller, Jr. | 211/162 |
| 7,140,503 | B2 * | 11/2006 | Krummell et al. | 211/151 |
| 2002/0190018 | A1 * | 12/2002 | Lewis | 211/151 |
| 2005/0082246 | A1 * | 4/2005 | Krummell et al. | 211/151 |

* cited by examiner

*Primary Examiner*—Darnell M Jayne
*Assistant Examiner*—Stanton L Krycinski
(74) *Attorney, Agent, or Firm*—Niro, Haller & Niro (57) ABSTRACT

The present invention is directed to a pallet storage system including a cart that rides on rails between an open or access position and a closed or storage position. More particularly, the present invention relates to a storage device that facilitates the picking of individual cases or items from pallets that are stored on the floor under a rack type storage structure. The device of the present invention enables two-deep storage of pallets on the floor and the automatic presentation of a rear pallet to the access aisle for easy picking of items stored on the pallet using a cart that cantilevers from the end of the rails.

14 Claims, 5 Drawing Sheets

CANTILEVER PALLET CART

BACKGROUND OF THE INVENTION

The present inventions relate generally to storage devices that support pallets and their loads. More particularly, the present inventions relate to storage devices that facilitate the picking of individual cases or items from pallets that are stored on the floor under a rack type storage structure. The devices of the present inventions enable two-deep storage of pallets on the floor and the automatic presentation of the rear pallet to the access aisle for easy picking of items stored on the pallet using a cart that cantilevers from the end of the rails.

There are numerous types of storage systems available to store a variety of loads. For example, in the grocery industry, shelf type storage racks in conjunction with pushback racks are widely used. In general, these systems are configured to form shelves that may directly support pallets and their loads or which may include pushback or other storage systems. In a typical grocery warehouse, the storage racks are arranged to form aisles for access by order pickers and machinery such as straddle trucks and lift trucks. The order pickers pick individual items from the pallets on the lower level and the floor, and the machinery is used to store, retrieve and/or transfer the full pallets from the upper levels.

Again by reference to a typical rack structure in the grocery sector, the first shelf of the storage rack is typically 48" from the floor and each of the shelves above the first shelf are spaced approximately every 48" or at other increments as required for the facility. In addition, such shelves are typically sized to be able to support and store two pallets wide and two pallets deep between each of the rack trusses and the transverse and lateral beams. Generally, such shelves are 96" deep by 96" wide. These racks may extend from floor to ceiling and store thousands of pallets.

Because of the height of the typical shelves, storage and removal of pallets and their loads on the second and higher shelves are done with straddle and/or fork lift trucks, since the second shelf is typically 8' off of the floor. That leaves the floor and the first shelf (4' off the floor) from which individual items may be picked from the pallets by the order pickers. The first shelf is typically provided with a well known two-deep pushback system that presents the rear pallet to the front for easier picking. However, a pushback rack level is not practical for use on the floor because, among other things, it interferes with the straddles of a straddle truck which is used to place and remove the pallets at these locations. Thus, in order to reach items on the rear pallet on the floor, an order picker has to crawl under the first shelf to reach the rear pallet. Clearly, it is difficult and dangerous for an order picker to reach items on the rear pallet on the floor. This potentially dangerous situation may be avoided by eliminating storage of the rear pallets on the floor. Alternatively, a fork lift truck may be used to move the rear pallet to the front as needed. Not using the rear position is a waste of space and reduces storage density. And, using a truck to rearrange the pallets is an inefficient use of resources and takes additional time.

Accordingly, there is a need to make the items on a rear pallet of a two-deep set-up readily accessible, while at the same time maintaining maximum storage density. There is also a need to achieve such accessibility at a minimum of expense and without the need for special lift equipment and the like. In addition, there is a need for the convenient presentation of a pallet and its load in single-deep storage settings.

SUMMARY OF THE INVENTION

The present inventions preserve the advantages of known storage systems and also provide new features and advantages. For example, the present inventions provide a cantilever cart storage system which is capable of moving a load, such as a pallet, from a storage position to an access position adjacent to an access aisle, including at least one pair of spaced, parallel rails that gradually slope downward from the storage position to the access position, the rails having a lower rolling surface, a side rolling surface and an upper rolling surface; a cart having two pairs of wheels on each side of the cart, a rear pair mounted on a rear portion of the cart and a front pair mounted forward of the rear wheels, the wheels capable of rolling engagement with the upper and lower rolling surfaces of the rail so that the cart remains on the rails as the cart moves between the storage and access positions; and, at least one guide roller mounted to a forward portion of the rails to aide in lateral alignment of said cart during movement of said cart. The present inventions may also include a pair of guide rollers mounted on each side of the cart for aiding lateral alignment of the cart during movement and may have rails which are shorter in length than twice the length of a pallet or other load. The invention may also include a cart stop bumper on the rails and the cart may include a deterrent to engage the bumper to limit the forward movement of the cart to the access position. The invention may also include a release to selectively permit the cart to roll to an access position or to lock it in a stored position.

The present inventions also provide a cantilever pallet cart for storing a pallet under a rack storage system in a back position which is capable of moving the pallet to a front position, the pallet and cart having a length and including at least one pair of spaced, parallel rails that slope downward from the back to the front, the rails having an upper surface, a side rolling surface and a lower rolling surface, the rails having a length less than twice the length of said cart; at least one pair of guide rollers mounted near the front of the rails to aid in lateral alignment of the cart during movement of the cart; at least two pairs of wheels mounted on each side of the cart, a back pair mounted near the back of the cart and a front pair mounted forward of the back pair and rearwardly of the center of the length of the cart, the back pair of wheels capable of rolling on the upper rolling surface when the cart is in a front or back position, or anywhere in between; and, at least one pair of guide rollers mounted near the back of the cart and capable of rolling on the side rolling surface of the rails to aide in lateral alignment of the cart during movement of the cart. The rails may also include a cart stop bumper and the cart may include a cart deterrent capable of interacting with the bumper to limit the forward movement of the cart.

Accordingly, it is an object of the present invention to provide a pallet (or other load) storage system that is capable of moving the pallet from a rear or storage position to a front or access position for access to the items on a pallet.

Another object of the present invention is to provide a cart storage system having a cart which rides on rails, the front of the cart being capable of extending, in a cantilever fashion, beyond the end of the rails.

An additional object of the present invention is to provide a pallet storage system that presents stored items for easy access by order pickers from an access aisle.

A further object of the present invention is to provide a cart storage system that may be utilized on the floor of a rack storage system to help maximize storage density.

INVENTOR'S DEFINITION OF THE TERMS

The terms used in the claims of this patent are intended to have their broadest meaning consistent with the requirements of law. Where alternative meanings are possible, the broadest meaning is intended. All words used in the claims are intended to be used in the normal, customary usage of grammar and the English language.

BRIEF DESCRIPTION OF THE DRAWINGS

The stated and unstated features and advantages of the present inventions will become apparent from the following descriptions and drawings wherein like reference numerals represent like elements in the various views, and in which.

DETAILED DESCRIPTION OF PREFERRED EMBODIMENTS

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

Figure 1:
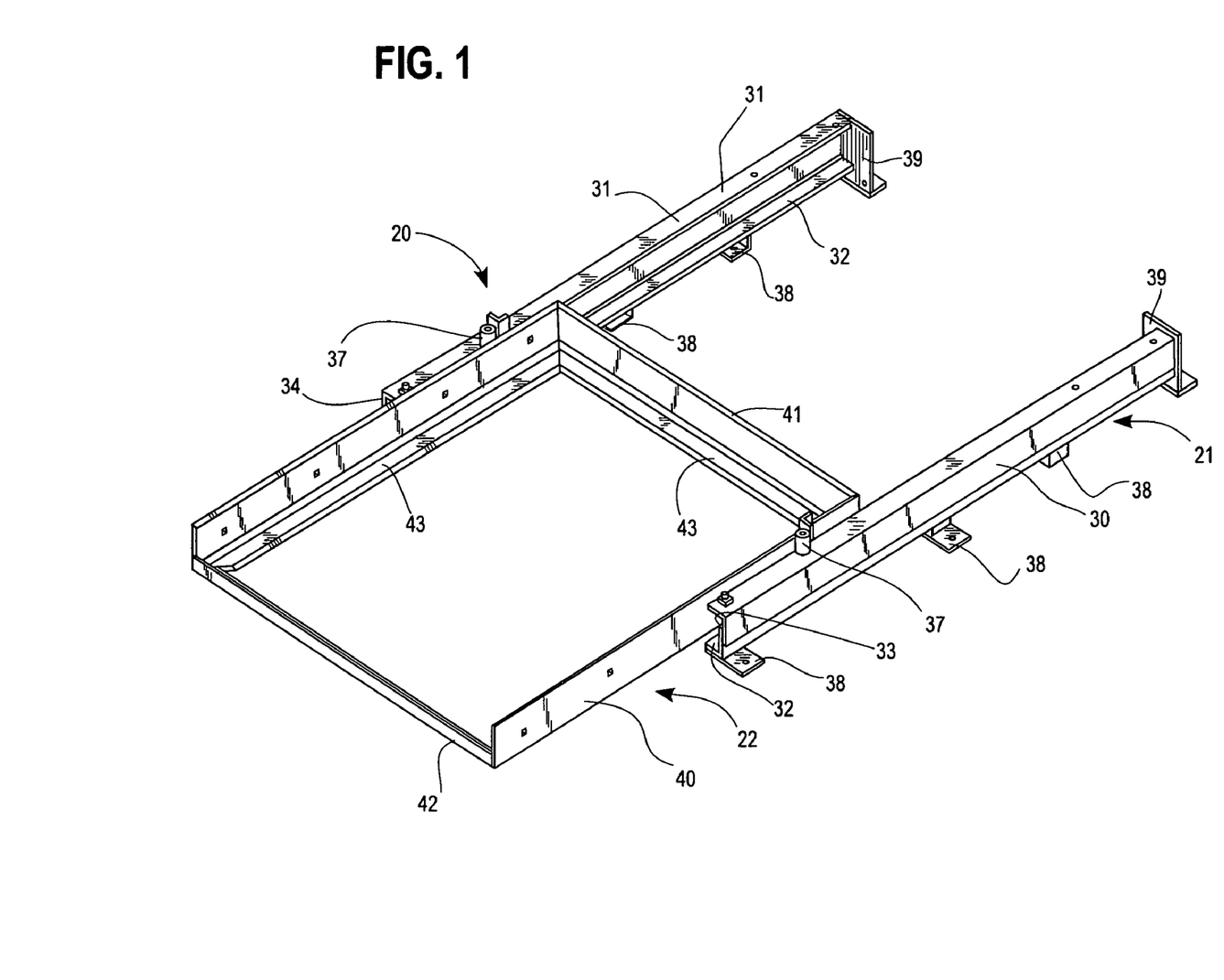
FIG. 1 is a perspective view of a preferred embodiment of a cantilever pallet drawer of the present invention shown in a forward or open position.
Figure 2:
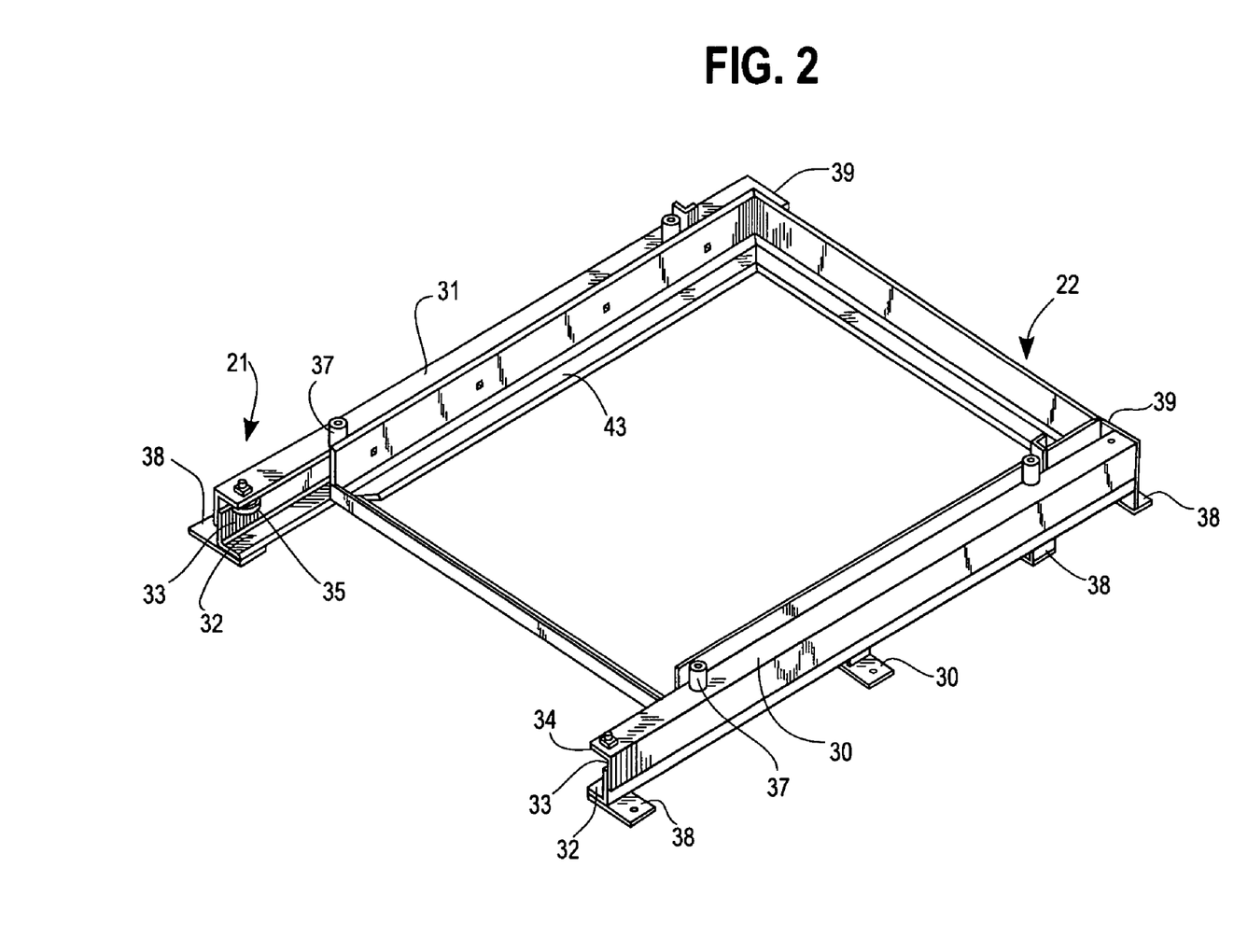
FIG. 2 is a perspective view of the embodiment of FIG. 1 shown in a rearward or closed position.
Figure 7:
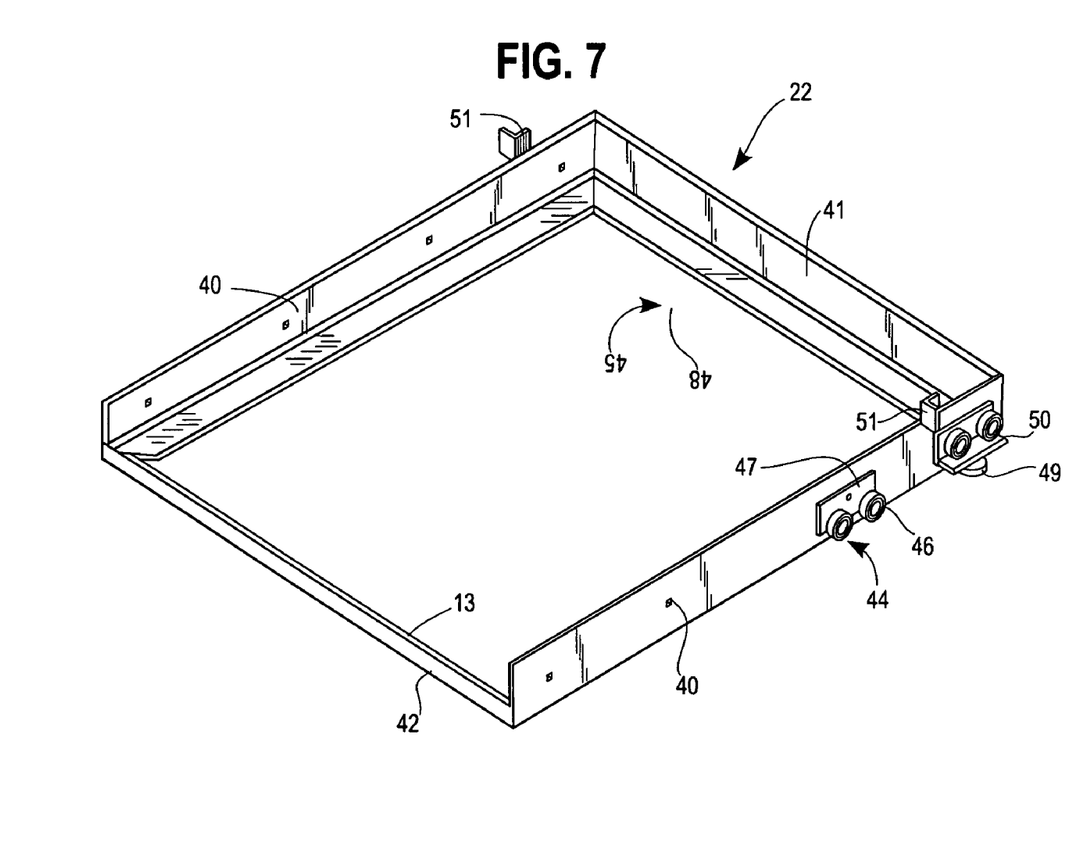
FIG. 7 is a perspective view of a preferred embodiment of a cart assembly of the present invention.
Figure 8:
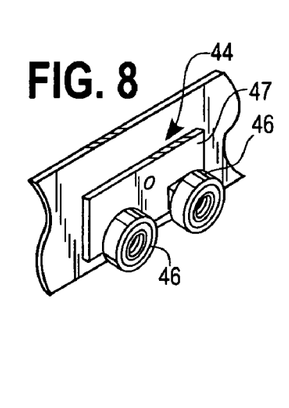
FIG. 8 is an exploded perspective view of components of a front cart roller of the present invention.
Figure 9:
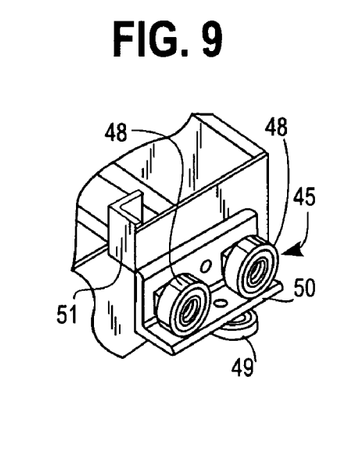
FIG. 9 is an exploded perspective view of a preferred rear cart roller and cart stop of the present invention.

The cantilever pallet drawer of the present invention is shown generally as 20 in FIGS. 1 and 2, and consists of two basic assemblies. Specifically, a rail assembly 21 is provided, a preferred embodiment of which is shown in more detail in FIGS. 3-6 and 10. A cart assembly 22 is also provided, a preferred embodiment of which is shown in more detail in FIGS. 7-9. The cantilever pallet drawer 20 of the present invention is principally designed to be used on the floor of a warehouse, which is typically a concrete slab. Cantilever drawer 20 is sized to support a standard pallet and its load and to fit under the first shelf of typical two-deep type storage structures, a preferred embodiment of which is shown in FIG. 10.

When cart assembly 22 is in an open position, as shown in FIG. 1, it positions the rear pallet and its load adjacent to the access aisle for easy access by an order picker. When drawer 20 is in its closed position, as shown in FIG. 2, it stores a pallet and its load in the second deep position for storage and later use. The rear pallet and the cantilever cart assembly 22 are held in the closed position by the front pallet until it is unloaded and removed. Alternatively, an optional lock and release mechanism (not shown) may be provided. Providing an optional lock and/or release mechanism, as will be understood by those of ordinary skill in the art, is particularly useful in settings where there is no front pallet to hold cart assembly 22 in a closed position or otherwise as the needs require. It will be understood by those of ordinary skill in the art that the present inventions may be used in other storage settings, for example one-deep settings, including those without storage bays, and may be made in a variety of sizes depending upon the application. Moreover, it will be understood that its use is not limited to being placed on the floor.

In addition, in this patent, preferred embodiments of the present invention 20 are described with reference to certain structural or formed components as preferred. However, it will be understood by those of ordinary skill in the art that cantilever pallet cart 20 and its related cart 22 and rail 21 assemblies may be constructed from a wide variety of materials (such as iron, steel or aluminum) having a variety of cross-sectional or formed shapes (such as plates, channels, angles, tubing, I-beams and S-beams).

Figures 3, 4:
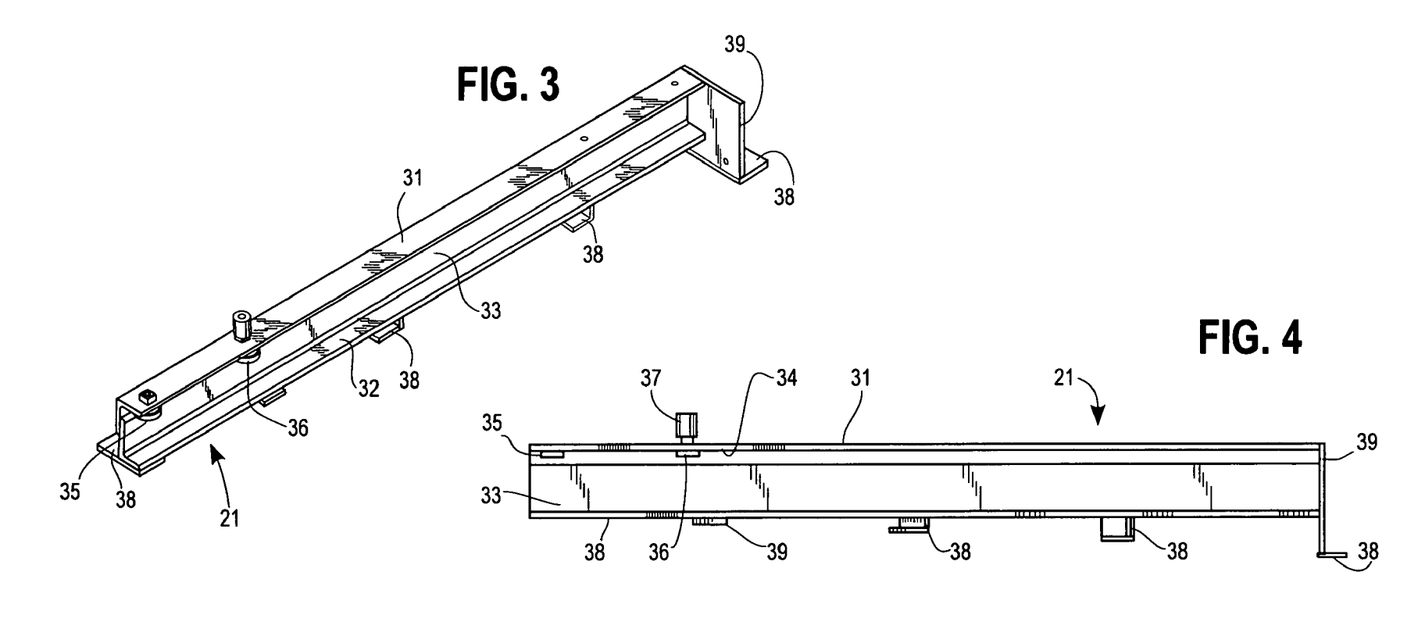
FIG. 3 is a perspective view of a left rail of a preferred rail assembly of the present invention.
FIG. 4 is a side view of the rail of FIG. 3.
Figure 5:
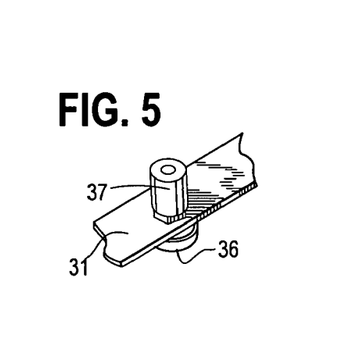
FIG. 5 is an exploded perspective view of components of a preferred embodiment of a back guide roller and cart stop bumper of the present invention.
Figure 6:
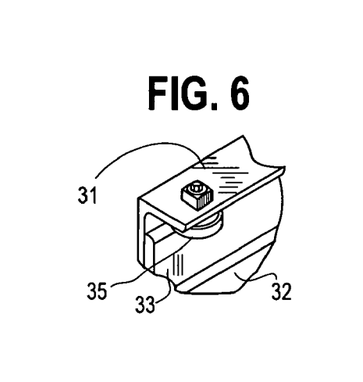
FIG. 6 is an exploded perspective view of components of a preferred embodiment of a front guide roller of the present invention.
Figure 10:
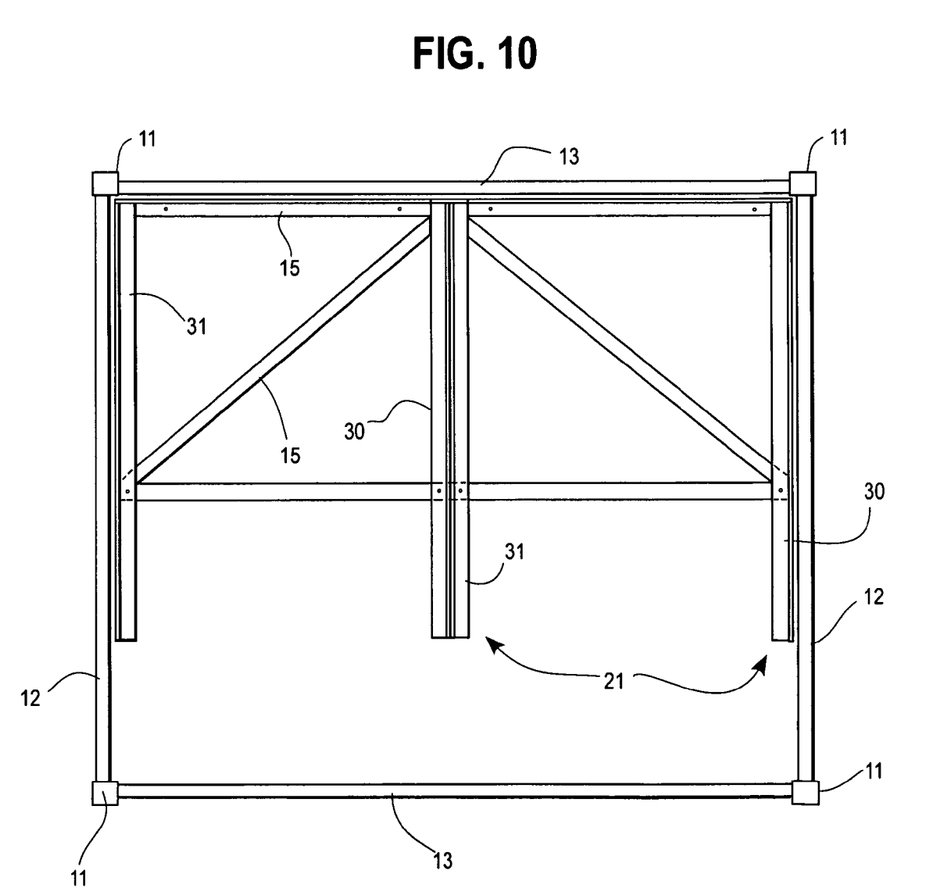
FIG. 10 is a plan view of the rails of a preferred embodiment of the present invention shown in relation to a typical storage rack system under which it may, but is not required to, be utilized.

Details of a preferred embodiment of rail assembly 21 may be seen by reference to FIGS. 1-6 and its placement in a typical storage setting is shown in FIG. 10. Rail assembly 21 includes a right rail 30 and a left rail 31 which is spaced from and parallel to right rail 30. Each rail 30 and 31 has a lower rolling surface 32, a side rolling surface 33 and an upper rolling surface 34. Although only left rail 31 is shown in FIGS. 3-5, it will be understood by those of ordinary skill in the art that right rail 30 is substantially the mirror image of left rail 31 which is spaced apart to accommodate cart assembly 21 as hereinafter described (see FIGS. 3-6 and 10). As shown in the Figures, rails 30 and 31 are preferably fabricated from two angles welded together to form a channel. Of course, rails 30 and 31 may be constructed from a channel, or a variety of structures or formed materials, consistent with the present inventions.

The front end of each rail 30 and 31 is provided with a front guide roller 35. Spaced rearwardly of front guide roller 35 is a back guide roller 36 which is provided on rails 30 and 31. A cart stop bumper 37 is provided on the rails 30 and/or 31, which may be part of an assembly including back guide roller 36. It will be understood by those of ordinary skill in the art that guide rollers 35 and 36 and bumper 37 may be provided in a number of forms and locations consistent with the present inventions and as hereinafter described.

In a preferred embodiment of the present invention, rails 30 and 31 are shorter than the length of two carts. Preferably, the length of rails 30 and 31 is approximately 1½ times the length of cart assembly 22 (see FIG. 10). In this manner, when cart assembly 22 is in the open or forward position (see FIG. 1), it cantilevers out from the rails for ease of access from the pick aisle. And, when cart assembly 22 is in the closed or back position (see FIG. 2), the rails 30 and 31 do not protrude unnecessarily into the forward space so as not to interfere with the straddles of a straddle truck. A representative example of the rail assembly 21 is shown in plan view in FIG.

10, along with representative columns 11, lateral beams 12 and transverse beams 13 of a typical storage structure. As shown therein, but not as a limitation, the two pairs of rail assemblies 21 are side by side and are shown in relation to the frame of a typical rack storage structure.

The rails 30 and 31 of rail assembly 21 may also include feet 38 and a back stop 39. Feet 38 may be used to secure rail assembly 21 to the floor. In addition, feet 38 may also be used to provide the desired slope to rails 30 and 31 so that cart assembly 22 rolls smoothly forward when the front pallet is removed to permit easy access to the contents of the rear pallet. As best shown in FIG. 4, feet 38 decrease in height from back to front so that rails 30 and 31 slope gradually downward from back to front. Back stop 39 may be used to keep cart assembly 22 from being push off of rail assembly 21, especially when a pallet and its load are pushed back into the rearward position on cart assembly 22. And, as shown in FIG. 10, the rail assembly 21 may include a variety of support braces or other reinforcing members 15, as will be understood by those of ordinary skill in the art.

The details of cart assembly 22 may be seen by reference to FIGS. 1, 2 and 7-9. The frame of cart assembly 22 consists of side members 40, a rear member 41 and a front member 42. A horizontal lip or flange 43 on frame members 40, 41 and 42 provides a support surface to hold a pallet and its load (not shown). In a preferred embodiment, frame members 40, 41 and 42 are made from structural angles, although a wide variety of structural or formed members may be used. The front member 42 has a lower vertical portion to permit easy placement and retrieval of a pallet on cart assembly 22.

Cart assembly 22 also includes a pair of front wheel assemblies 44 and a pair of rear wheel assemblies 45 that are attached to side members 40 on each side of cart assembly 22. In a preferred embodiment, front wheel assembly 44 includes a pair of wheels 46 and a reinforcing plate 47, if desired. However, wheels 46 may be attached to front member 40 in a variety of well known ways. Wheels 46 are designed to roll on lower rolling surface 32 of rails 30 and 31, as hereinafter described. Similarly, a rear wheel assembly 45 is also provided which includes a pair of wheels 48. A rear guide roller 49 is also provided to aid in lateral orientation of cart assembly 22 by rolling on side rolling surface 33 during cart assembly 22 operation. Wheels 48 are intended to roll on upper rolling surface 34 of rails 30 and 31.

In a preferred embodiment, both sets of wheels 44 and 45 are behind the center of the length of the cart assembly 22. This permits the use of shorter rails 30 and 31 and enables cart assembly 22 to cantilever out from the rails as shown in FIG. 1. When a pallet is placed on lip or flange 43, its weight forces wheels 46 of front wheel assembly 44 downward onto lower rolling surface 32. Also, the back of cart assembly 22 pivots upward from front wheel assembly 44 so that wheels 48 of rear wheel assembly 45 contacts upper rolling surface 34.

In a preferred embodiment, wheels 48 and guide roller 49 are connected to side members 40 using an angle 50. It will be understood by those of ordinary skill in the art that a variety of means may be used to attach the wheels 48 and guide roller 49 to side member 40. Also associated with rear wheel assembly 45 is a cart deterrent 51. Cart deterrent 51 is designed to limit the forward movement of cart assembly 22 by engaging cart stop bumper 37.

The operation of cantilever pallet drawer 20 will now be described by reference to FIGS. 1 and 2. Cart assembly 22 is in its back or closed position as shown in FIG. 2, and is held in this position by a front pallet or an optional lock and release mechanism (not shown). Wheels 48 of rear wheel assembly 45 are engaged with upper rolling surface 34 or rails 30 and 31. Wheels 46 of front wheel assembly 44 are engaged with lower rolling surface 32. Rear guide rollers 49 on cart assembly 22 keep it properly aligned within the rails 30 and 31 against side rolling surface 33. Similarly, back guide roller 36 on rails 30 and 31 keep the front of cart assembly 22 in proper lateral alignment.

When the front pallet is removed, cart assembly 22 may roll to its forward position as shown in FIG. 1. As the cart assembly 22 rolls forward, wheels 46 ride on lower rolling surface 32, wheels 48 ride on upper rolling surface 34 and rear guide roller 49 rides on side rolling surface 33. Cart assembly 22 is stopped in its most forward or open position when cart deterrent 51 is engaged with cart stop bumper 37 as shown in FIG. 1.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. A cantilever cart storage system for moving a load, such as a pallet, from a storage position to an access position, comprising:

at least one pair of spaced, parallel rails that are stationary and gradually slope downward from the storage position to the access position, the stationary rails having a lower rolling surface, a side rolling surface and an upper rolling surface;

a cart having two pairs of wheels on each side of said cart, a rear pair mounted on a rear portion of said cart and a front pair mounted forward of said rear wheels and rearward of the center length of said cart, said wheels capable of rolling engagement with the upper and lower rolling surfaces of said stationary rail so that said cart remains on said stationary rails as said cart moves between the storage and access positions;

wherein said rear wheels are in contact with said upper rolling surface of said stationary rail at least when said cart is in the access position; and at least one guide roller mounted to a forward portion of the stationary rails in a horizontal orientation to contact at least one side of said cart to aide in lateral alignment of said cart during movement of said cart.

2. The invention of claim 1 wherein said cart includes a pair of guide rollers mounted on each side of the cart for aiding lateral alignment of said cart during said movement.

3. The invention of claim 1 wherein said rails are shorter in length than twice the length of said cart.

4. The invention of claim 1 wherein said rails include a cart stop bumper and said cart includes a deterrent to engage said cart stop bumper to limit said movement of said cart to said access position.

5. The invention of claim 1 wherein said rear pair of wheels includes at least 2 wheels and said front pair of wheels includes at least two wheels.

6. The invention of claim 1 wherein said rails include a second pair of guide rollers that arc mounted rearwardly of said guide roller.

7. The invention of claim 1 wherein said rails are made from structural or formed channels.

8. The invention of claim 1 wherein said rails are made from structural or formed angles.

9. The invention of claim 1 wherein said rails are supported by feet which decrease in height from the storage position or rear to the access position or front.

10. A cantilever pallet cart including a cart for supporting a load in a back position for moving said load to a front position, said cart having a length, comprising:
    at least one pair of spaced, parallel rails that are stationary and slope downward from the back to the front, the rails having an upper surface, a side rolling surface and a lower rolling surface, said rails having a length less than twice the length of said cart;
    a cart stop bumper;
    at least two pairs of wheels mounted on each side of said cart, a back pair mourned near the back of the cart and a front pair mounted forward of said back pair and rearwardly of the center of the length of said cart, said back pair of wheels in contact with said upper rolling surface when said cart is in the front position and said front pair of wheels rolling on said lower rolling surface;
    at least one pair of guide rollers mounted to said cart near the back of said cart and capable of rolling contact on said side rolling surface of said rails to aide in lateral alignment of said cart during movement of said cart;
    at least one pair of guide rollers mounted to a forward portion of each spaced apart stationary rail to aid in lateral alignment of said cart during movement of said cart; and,
    a cart deterrent on said cart, said cart deterrent being independent of said wheels and interacting with said cart stop bumper to limit forward movement of said cart.

11. The invention of claim 10 wherein said rails are made from structural or formed channels.

12. The invention of claim 10 wherein said cart is made from structural or formed angles.

13. The invention of claim 10 wherein said rails are made from structural or formed angles.

14. The invention of claim 1 wherein said rails are made from structural wide-flanged shapes.

* * * * *

UNITED STATES PATENT AND TRADEMARK OFFICE
CERTIFICATE OF CORRECTION

| | | |
|---|---|---|
| PATENT NO. | : 7,780,019 B2 | Page 1 of 1 |
| APPLICATION NO. | : 11/476183 | |
| DATED | : August 24, 2010 | |
| INVENTOR(S) | : Anthony N. Konstant | |

It is certified that error appears in the above-identified patent and that said Letters Patent is hereby corrected as shown below:

Column 6, line 49, delete "arc" and replace with -- are --.

Column 7, line 2, delete "arc" and replace with -- are --.

Column 7, line 21, delete "mourned" and replace with -- mounted --.

Signed and Sealed this

Nineteenth Day of October, 2010

David J. Kappos
*Director of the United States Patent and Trademark Office*